United States Patent Office 3,398,576
Patented Aug. 27, 1968

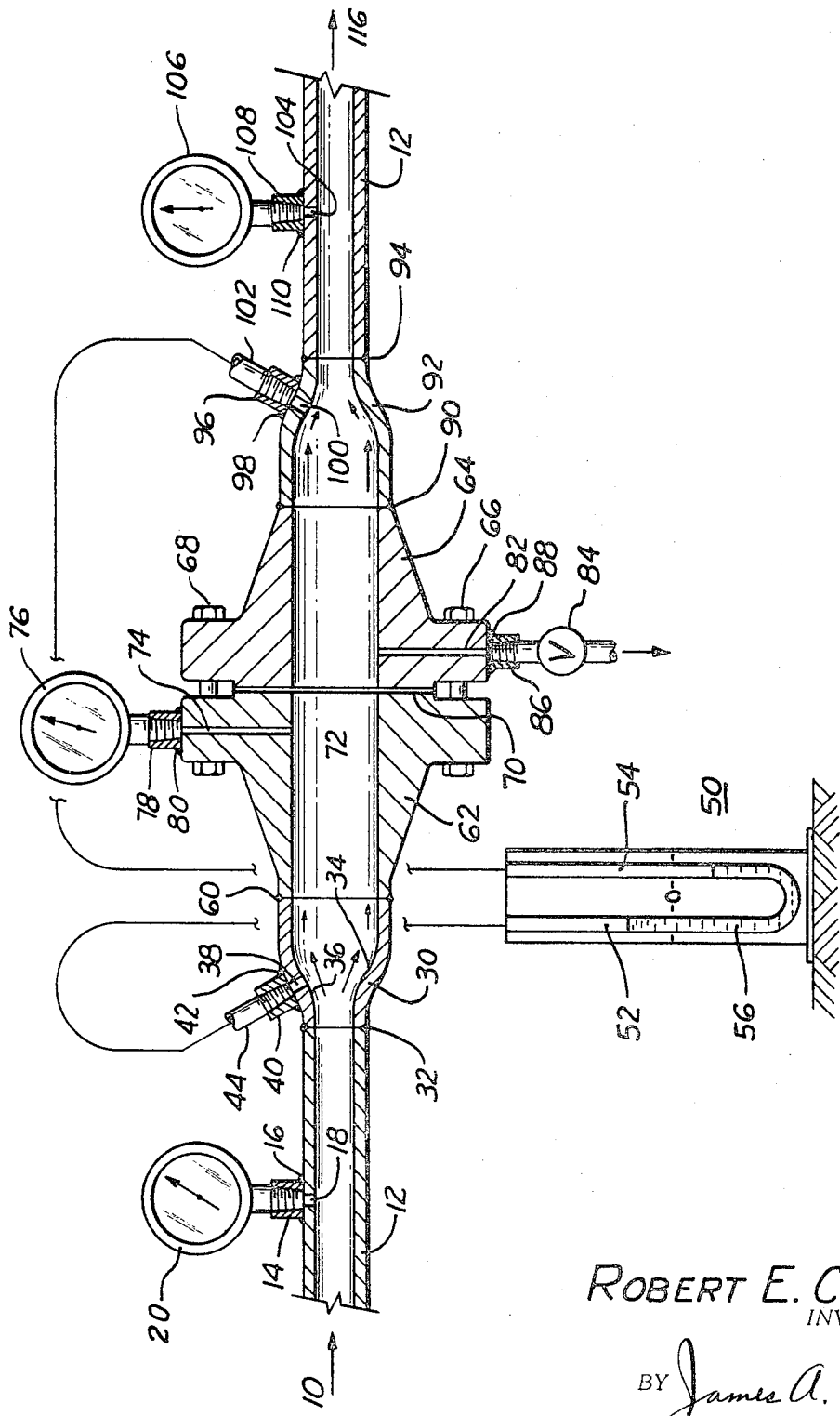

3,398,576
FLOW MEASURING DEVICE
Robert E. Cleary, 3224 Timmons Lane, Apt. 123,
Houston, Tex. 77027
Filed Mar. 15, 1965, Ser. No. 439,867
3 Claims. (Cl. 73—205)

ABSTRACT OF THE DISCLOSURE

A device for measuring the flow of fluids in flow lines embodying means adapted to be inserted in the line to provide an elongated chamber therein of substantially larger diameter than the diameter of the line, and including means at each end of the chamber forming a generally conically shaped wall portion, flaring longitudinally inwardly of the chamber, whose internal surface is smoothly curved longitudinally to substantially reduce friction losses and eddying of the fluid which would otherwise result due to abrupt changes in diameter. The device also includes a fluid flow connection opening into the chamber through each of the curved end wall portions at a location mediate the ends thereof for connecting a pressure differential measuring device in communication with the chamber adjacent its opposite ends, by which the difference in pressure resulting from the flow of fluid through the chamber is measured.

---

This invention pertains generally to flow devices and particularly to a device which is a differential producer and which measures flow through pipes.

Although various flow measuring devices are well known in the art of measuring and control, known flow measuring devices have not provided simplicity, low manufacturing cost, reliable and accurate measurement, and have not been useable with any type of fluid or liquid regardless of viscosity or velocity of flow. Among the known flow measuring devices are those disclosed in U.S. Patent 2,573,430 issued Oct. 30, 1951, with V. Gentile, Jr. as patentee, U.S. Patent 3,071,160 issued Jan. 1, 1963, to J. Weichbrod, and U.S. Patent 3,116,639 issued Jan. 7, 1964, to W. G. Bird. Known flow measuring devices have presented problems in head losses, friction losses, and acceptable performance when abrasive, semisolid, and solid impurities are in the flowing medium. The present invention provides practicable improvements or solutions to many of the problems encountered in prior art devices.

Thus, it is an object of the present invention to provide an improved flow measuring device.

Another object of the present invention is to provide a flow measuring device which is characterized by ease of fabrication, low manufacturing cost, and general availability of the components used in such flow measuring device.

Yet another object of the present invention is to provide a flow measuring device having low head loss, low friction loss, complete reversibility, and acceptability of a flowing medium which contains abrasive, semi-solid or solid impurities in such flowing medium.

Still another object of the present invention is to provide a flow measuring device which is accurate to within about one-half of one percent (½ of 1%) of the volume measured.

Another object of the present invention is to provide a novel, simplified device that embraces the characteristics of compactness, accuracy, efficiency and multiplicity of practical application in measurement of fluid, velocity and mass flow.

Yet another object of the present invention is to provide a device of a character in which no projection into the fluid stream is necessary and which offers no restriction to the flow of the fluid stream.

Still another object of the present invention is to provide a device which allows complete reversibility of the fluid medium with no change in the function, accuracy, or efficiency of the device.

Another object of the present invention is to eliminate development of two phase flow problems which occur in devices which use restrictions or projections into the fluid stream.

Another object of the present invention is to provide means of retaining accuracy of measurement of flow subject to conditions caused by abrupt changes in direction of the flow prior to fluid entry into said means.

Another object of the present invention is to provide a differential producer which may be used as an eductor in mixing and batching operations where continuous flow exists through pipes.

Another object of the present invention is to provide a differential producer suitable for use as an eductor wherein mixing and batching of corrosive fluids or fluids with impurities entrained where other devices are undesirable from a cost standpoint.

Briefly stated, the present invention provides a flow measuring device or an eductor wherein the rate of flow is derived from inferential differential pressures in gaseous or liquid fluids by changes in the fluid velocity. Such device depends for its operation on the differential pressure produced between the upstream and downstream pressure taps. The difference in pressure results from the separation of the flowing medium from the wall of the curved part of a concentric reducer which is induced by the inherent velocity of the flow and as a result of the inertial forces present according to Newtonian Laws of Physics and the Bernoulli Principle. Additional differential is produced by the suction and impact effects of the flow at the manometer pressure taps. The flow measuring device of the present invention is fabricated principally from well known and available components coacting in their effect to provide an unusual and unexpected result which allows the flow measuring device of the present invention to maintain extreme accuracy and reliability.

In the drawings, the single figure is a partial cross-sectional plan view of the device incorporating the present invention.

Referring now to the drawing in detail, a source of fluid flow 10 is shown passing through a conventional pipe 12 having a coupling 14 welded at 16 to the pipe 12. Opening 18 in the pipe 12 communicates with a line gauge 20 well known in the art.

A concentric reducer 30 or similarly formed section is welded at 32 to pipe 12. Concentric reducer 30 provides an increased volume near portions 34 and 36. It will be appreciated by those skilled in the art of fluid measurement that the concentric reducer shown and described in connection with the present invention is merely a representative configuration and other forms and configurations may be used if the proper curvature is embodied therein. Concentric reducer 30 has an opening 38 extending into coupling 40 which is welded at 42 to concentric reducer 30. Threadedly coupled to the coupling 40 is line 44 of a manometer 50 having tubes 52 and 54 forming a U-shape. Disposed in the U-shape portion of manometer 50 is water or mercury 56 which allows the manometer to operate in a well known manner.

Concentric reducer 30 is welded at 60 to a first weld neck flange 62. A second weld neck flange 64 is coupled to the first weld neck flange 62 by suitable fastening means such as 66 and 68. Positioned between the first weld neck flange 62 and the second weld neck flange 64 is a gasket 70. The fastening means 66 and 68 may be of the conventional bolt and nut type extending circumferentially on weld neck flanges 62 and 64.

The diameter of the opening 72 of the first and second weld neck flanges 62 and 64 is substantially identical with the maximum opening of concentric reducer 30. The first weld neck flange 62 has a port 74 extending to a line gauge 76 which is threadedly coupled to a coupling 78. Coupling 78 is welded at 80 to the first weld neck flange 62 so that port 74 communicates with the line gauge 76.

The second weld neck flange 64 has a port 82 which communicates with a drain valve 84. A line gauge may be positioned where valve 84 is located. Valve 84 or a line gauge is threadedly coupled to a coupling 86 which may be welded at 88 to provide communication between port 82 and the valve 84 or line gauge positioned in place of valve 84.

Welded at 90 to the second weld neck flange 64 is a concentric reducer 92 substantially identical to the first concentric reducer 30. The concentric reducer 92 is welded at 94 to pipe 12.

Concentric reducer 92 has a coupling 96 welded at 98 to the concentric reducer 92 to provide communication between port 100 and line 102 which is coupled to manometer tube 54.

Pipe 12 has an aperture or opening 104 which communicates with line gauge 106. Line gauge 106 may be threadedly coupled to a coupling 108 which is welded at 110 to pipe 12.

Thus, from observing the drawing it will be appreciated that flow entering at 10 through pipe 12 prior to leaving pipe 12 at 116 passes through the flow measuring arrangement of the present invention. At concentric reducer 30 a separation and suction effect is provided while at concentric reducer 92 an impact effect is provided which acts upon manometer 50 through low pressure tube 52 and high pressure tube 54. Well known laws of physics are followed at the concentric reducers to provide differential pressure. As mentioned previously, additional differential is produced by the suction and impact effects of the flow at the manometer pressure taps.

It will be appreciated that the manometer couplings 40 and 96 may be positioned at any angle perpendicular to the flow or to an angle parallel to the direction of flow if necessary. Computation of actual flow for each particular differential will follow the square laws in various well known hydraulic equations corrected for the numerous variables involved in measuring different mediums under different conditions. When testing the device of the present invention under controlled conditions data such as coefficients will enable actual flow to be obtained.

As seen in the drawing the reducers 30 and 92 are of tapering shape, each having a wall portion presenting a longitudinally smoothly curved, generally conical inside surface through which the ports 38 and 100 open at locations mediate the ends of the wall portions, whereby abrupt change in the direction of flow of fluid passing through the device is eliminated. By this construction the accuracy of the device is increased due to the substantial elimination of friction losses and eddying of the fluid caused by abrupt changes in diameter.

The present invention allows reverse flow of the fluid medium while also providing low head loss, low friction loss, and useability of the device with flowing mediums having various impurities therein.

The present invention is characterized by several commercially advantageous features, namely retention of commonly accepted methods well known in the trade related to the accumulation and recording of inferential differential data acquired to determine flow rates.

Also the device of the present invention will conform to presently accepted accounting methods instituted to comply with the requirements of regulatory agencies for retaining a record of flow through pipelines.

Thus, the present invention provides an improved flow measuring device which is simple, economical in manufacturing cost and in operation, and which provides accurate readings of the velocity flow.

Although a preferred embodiment of the present invention has been shown and described in compliance with the statutory provision of the U.S. patent laws, the scope of the invention is defined by the following claims. Although such claims have been presented in indented format to facilitate reading and understanding thereof such indented format should not be construed to be a structural or functional limitation of the elements or steps recited in such claims.

I claim:

1. A device for measuring the rate of fluid flow, said device including in combination,
    differential producer means including first and second tap means, said differential producer means having a chamber along its longitudinal axis with said chamber having longitudinally spaced first and second longitudinally inwardly flaring portions having internal, longitudinally curved surfaces through which the respective ones of said tap means open into the chamber through the responsive ones of said portions, and
    measuring means coupled to said first and second tap means for measuring the differential in pressure when fluid passes through said differential producer means.

2. A device for measuring the rate of fluid flow, said device including in combination,
    first and second concentric reducer means including first and second longitudinally spaced tubular reducer means each having an internal surface which flares longitudinally, means connecting said reducer means to form therewith a chamber of uniform internal diameter at least equal to the maximum diameter of said surface, tap means opening into the chamber through each of said surfaces, and
    measuring means coupled to said tap means for measuring the differential in pressure as fluid passes through said first and second reducer means.

3. A device for measuring the rate of fluid flow in a pipeline, said device including in combination,
    first reducer means positioned in said pipeline, said first reducer means having first coupling means positioned where the diameter increases on said first reducer means,
    second reducer means positioned downstream in said pipeline from said first reducer means, said second reducer means having second coupling means positioned where the diameter decreases on said second reducer means each of said reducer means having an internal surface which flares toward the other reducer means and is smoothly curved longitudinally, and
    manometer means coupled to said first and second coupling means through said surfaces to indicate the pressure differential as fluid passes through the pipeline.

References Cited

UNITED STATES PATENTS

| 1,140,661 | 5/1915  | Brodie    | 73—213 |
| 1,697,344 | 1/1929  | Campbell  | 73—211 |
| 2,337,921 | 12/1943 | Petroe    | 73—213 |
| 3,071,001 | 1/1963  | Goldsmith | 73—211 |
| 3,264,871 | 8/1966  | Beynon    | 73—231 |
| 944,417   | 12/1909 | Connet    | 73—213 |
| 3,034,353 | 5/1962  | Anderson  | 73—212 |

RICHARD C. QUEISSER, Primary Examiner.

E. D. GILHOOLY, Assistant Examiner.

UNITED STATES PATENT OFFICE
CERTIFICATE OF CORRECTION

Patent No. 3,398,576                                    August 27, 1968

Robert E. Cleary

It is certified that error appears in the above identified patent and that said Letters Patent are hereby corrected as shown below:

Column 4, line 24, "responsive" should read -- respective -

Signed and sealed this 24th day of February 1970.

(SEAL)
Attest:

Edward M. Fletcher, Jr.

Attesting Officer

WILLIAM E. SCHUYLER, JR.

Commissioner of Patents